US012697752B2

(12) United States Patent
Baldwin et al.

(10) Patent No.: US 12,697,752 B2
(45) Date of Patent: Aug. 4, 2026

(54) CONTINUOUS CUTTING HORIZONTAL MULTI-WIRE STONE CUTTING MACHINE

(71) Applicant: ROCK-IT NATURAL STONE, INC., Wister, OK (US)

(72) Inventors: Brandon Chad Baldwin, Wister, OK (US); Billy Caleb Baldwin, Wister, OK (US); Ben Curious Baldwin, Wister, OK (US)

(73) Assignee: ROCK-IT NATURAL STONE, INC., Wister, OK (US)

( * ) Notice: Subject to any disclaimer, the term of this patent is extended or adjusted under 35 U.S.C. 154(b) by 0 days.

(21) Appl. No.: 19/394,053

(22) Filed: Nov. 19, 2025

(65) Prior Publication Data

US 2026/0138306 A1 May 21, 2026

Related U.S. Application Data

(60) Provisional application No. 63/722,678, filed on Nov. 20, 2024.

(51) Int. Cl.
*B28D 1/08* (2006.01)
*B24B 27/06* (2006.01)
(Continued)

(52) U.S. Cl.
CPC ............ *B28D 1/08* (2013.01); *B24B 27/0633* (2013.01); *B28D 7/005* (2013.01); *B28D 7/02* (2013.01); *B28D 7/04* (2013.01)

(58) Field of Classification Search
CPC . B28D 7/04; B28D 7/02; B28D 7/005; B28D 5/0082; B28D 5/045; B28D 1/08;
(Continued)

(56) References Cited

U.S. PATENT DOCUMENTS 3,215,253 A * 11/1965 Grantham ............ B65G 49/064 198/780
3,236,128 A * 2/1966 Holden .................... B27B 25/04 83/435
(Continued)

FOREIGN PATENT DOCUMENTS

CN 209969708 U 1/2020
WO WO-9929456 A1 * 6/1999 ......... B23D 57/0023

OTHER PUBLICATIONS

International Search Report and Written Opinion in related PCT Application PCT/US2025/056408 mailed Mar. 30, 2026, 11 pages.

*Primary Examiner* — Makena S Markman
(74) *Attorney, Agent, or Firm* — HOVEY WILLIAMS LLP

(57) ABSTRACT

A material cutting system for cutting a unit of input material. The material cutting system broadly includes a frame, a number of rollers rotatably supported on the frame, and a cutting assembly. The cutting assembly includes a number of pulleys rotatable relative to the frame, a drive motor drivably connected to the pulleys, and a number of cutting wires entrained on the pulleys such that rotation of the pulleys via the drive motor cycles the cutting wires. The rollers are configured to rotate thereby advancing the input material unit toward the cutting wires such that the cutting wires cut a number of kerfs into the input material unit and hence form a plurality of cut sections.

19 Claims, 12 Drawing Sheets

(51) Int. Cl.
*B28D 7/00* (2006.01)
*B28D 7/02* (2006.01)
*B28D 7/04* (2006.01)

(58) Field of Classification Search
CPC ........ B28D 1/086; B28D 1/066; B28D 1/068; B28D 1/005; B23D 57/0046; B23D 57/0023; B23D 57/003; B23D 57/0038; B23D 57/0053; B24B 7/06; B24B 27/0633; B26D 7/0625; B28B 11/14
USPC ...... 125/21; 83/808, 651.1, 661, 155, 404.4, 83/407, 408, 425.3, 436.6; 451/296
See application file for complete search history.

(56) References Cited

U.S. PATENT DOCUMENTS

| | | | | | | |
|---|---|---|---|---|---|---|
| 3,786,701 | A | * | 1/1974 | Ludwig | B26D 3/006 | 83/651.1 |
| 3,919,372 | A | * | 11/1975 | Vogele | B28B 11/145 | 414/789.2 |
| 4,536,145 | A | * | 8/1985 | Sawyer | B26D 3/28 | 425/289 |
| 5,605,141 | A | * | 2/1997 | Bilotta | B28D 1/08 | 125/16.02 |
| 6,655,248 | B1 | * | 12/2003 | Johnson | B26D 7/0625 | 83/651.1 |
| 8,003,032 | B2 | * | 8/2011 | Al-Sabih | B28B 11/12 | 264/294 |
| 12,434,312 | B2 | * | 10/2025 | Jensen | B23D 57/0023 | |
| 2004/0045637 | A1 | * | 3/2004 | Tanaka | C04B 35/5805 | 148/301 |
| 2007/0267006 | A1 | | 11/2007 | Ogyu | | |
| 2014/0190464 | A1 | * | 7/2014 | Hartwell | B28D 1/10 | 29/407.05 |
| 2023/0264277 | A1 | * | 8/2023 | Muqaibil | B28D 1/086 | 125/21 |

* cited by examiner

CONTINUOUS CUTTING HORIZONTAL MULTI-WIRE STONE CUTTING MACHINE

CROSS-REFERENCE TO RELATED APPLICATIONS

This non-provisional utility patent application claims priority benefit, with regard to all common subject matter, of earlier-filed U.S. Provisional Application Ser. No. 63/722,678; titled "CONTINUOUS CUTTING HORIZONTAL MULTI-WIRE STONE CUTTING MACHINE"; and filed Nov. 20, 2024. The Provisional Application is hereby incorporated by reference, in its entirety, into the present patent application.

BACKGROUND OF THE INVENTION

Wire cutting machines are often used to cut stone blocks such as granite and marble into slabs of various thicknesses and sizes to be used as countertops, tabletops, flooring, or other surfaces. These machines utilize multiple steel cutting wires that are horizontally spaced from one another and rotated around a series of pulley or wheels. A stone block is placed under the cutting wires, and then the wires are rotated and driven vertically downwardly through the stone block to create vertical cuts in the block thereby forming multiple stone slabs. By using multiple rotating cutting wires, these machines increase cutting efficiency and precision when compared to conventional stone saws while minimizing material waste.

Unfortunately, such machines can only work on one stone block at a time. A stone block must first be transported to and positioned within a machine. After the cutting wires are driven down through the stone block to cut the stone block into multiple slabs, the cutting wires must be raised back out of the vertical cuts in the stone block. The slabs must then be carefully separated and removed from the machine with forklifts or other machines. Then, only after the first stone block is cut and its resultant slabs are removed, can another stone block be transported to and positioned within the machine and cut. These steps must be repeated each time another stone block is to be cut, which incurs significant downtime and effort.

Cutting machines for cutting wood logs, metal beams, and other materials suffer from similar inefficiencies. For example, log cutting machines cut one slab at a time by a singular blade or wire such that a log must be repositioned for each cut.

SUMMARY OF THE INVENTION

Embodiments of the present invention address one or more of the above-mentioned problems and provide a distinct advance in the art of cutting systems. More specifically, the present invention provides a cutting system that simultaneously cuts a unit of input material, such as a stone block, while advancing additional units of input material thereby reducing downtime.

Applicant believes the present invention is the first horizontal, continuous-cut, multi-wire cutting system. Applicant further believes the present invention is the first multi-purpose cutting system configured to both cut large blocks of material and split slabs of material (i.e., dividing slabs in their shortest dimension via horizontal cuts). Applicant further believes the present invention is the first multi-layer cutting system (configured to make a plurality of vertically-spaced horizontal cuts). Applicant further believes the present invention is the first cutting system utilizing entirely horizontally-spinning cutting wire pulleys. Applicant further believes the present invention is the first cutting system in which the cutting wires pass through kerfs in a cutting phase and pass through the kerfs again in a return phase for continuous cutting.

An embodiment of the invention is a material cutting system for cutting a unit of input material. The material cutting system includes a frame, a number of rollers rotatably supported on the frame, and a cutting assembly. The cutting assembly includes a number of pulleys rotatable relative to the frame about a vertically extending axis, a drive motor drivably connected to the pulleys, and a number of cutting wires entrained on the pulleys such that rotation of the pulleys via the drive motor cycles the cutting wires. The rollers are configured to rotate thereby advancing the input material unit toward the cutting wires such that the cutting wires cut a number of vertically spaced kerfs into the input material unit and hence form a number of cut sections.

Another embodiment is a stone cutting system for cutting a stone block, the stone cutting system broadly comprising a cutting station including a frame, a lower conveyor, a middle conveyor, an upper conveyor, at least one drive motor, and a cutting assembly. The lower conveyor includes a first set of rollers. The middle conveyor includes a second set of rollers and is vertically adjustable on the frame. The upper conveyor includes a third set of rollers and is also vertically adjustable on the frame. The at least one drive motor is drivably connected to at least one of the first set of rollers, the set of rollers, and the third set of rollers for advancing the stone block on one of the lower conveyor, the middle conveyor, and the upper conveyor. The cutting assembly includes a number of pulleys rotatable relative to the frame about a vertically extending axis, a drive motor drivably connected to the pulleys, and a number of cutting wires entrained on the pulleys such that rotation of the pulleys via the drive motor of the cutting assembly cycles the cutting wires. At least one of the first set of rollers, the second set of rollers, and the third set of rollers is configured to rotate thereby advancing the stone block toward the cutting wires such that the cutting wires cut a number of vertically spaced kerfs into the stone block and hence form a number of stone sections.

Another embodiment also includes a spray system, a shimming system, a loading lift, an unloading lift, and a control system. The spray system is configured to spray a fluid near the kerfs to cool at least one of the stone sections and the cutting wires. The shimming system is configured to automatically insert shims into the kerfs. The loading lift includes a carriage configured to raise the stone block to at least one of the middle conveyor and the upper conveyor. The unloading lift includes a carriage configured to lower the stone sections from at least one of the middle conveyor and the upper conveyor. The control system is configured to activate the at least one drive motor of the cutting station, the drive motor of the cutting assembly, and the shimming system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
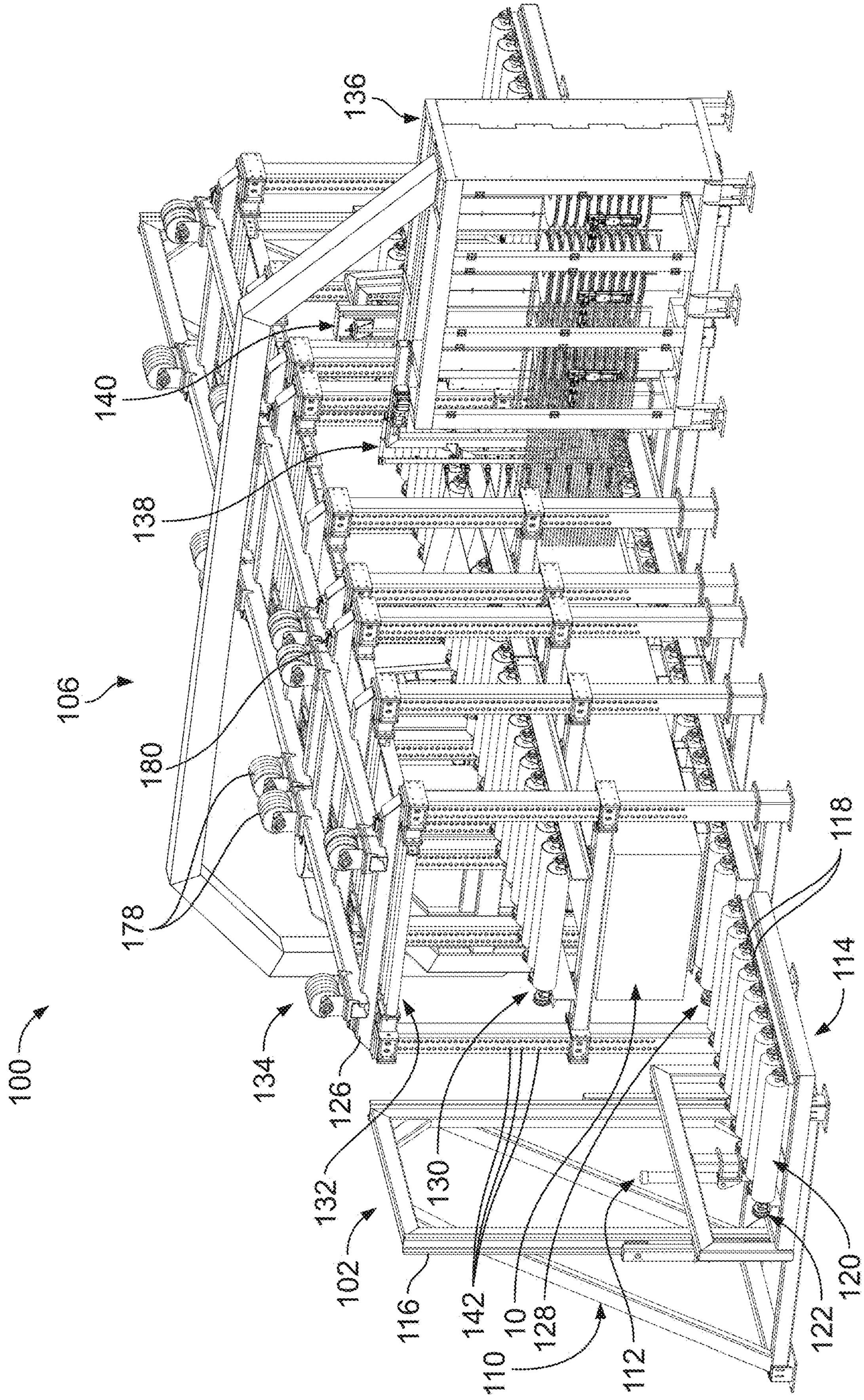
FIG. 1 is a perspective view of a stone cutting system constructed in accordance with an embodiment of the invention.
Figure 2:
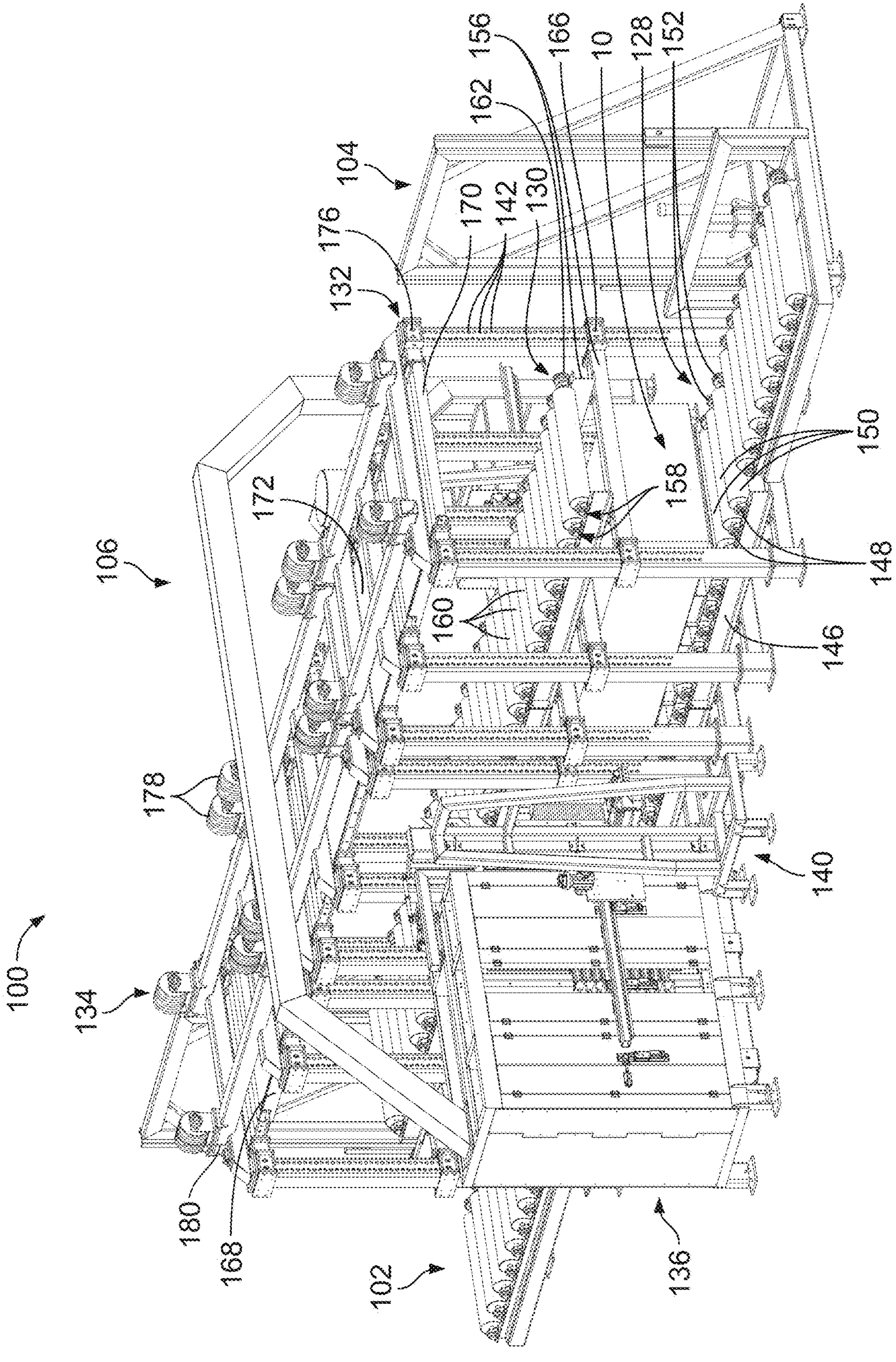
FIG. 2 is another perspective view of the stone cutting system of FIG. 1.
Figure 3:
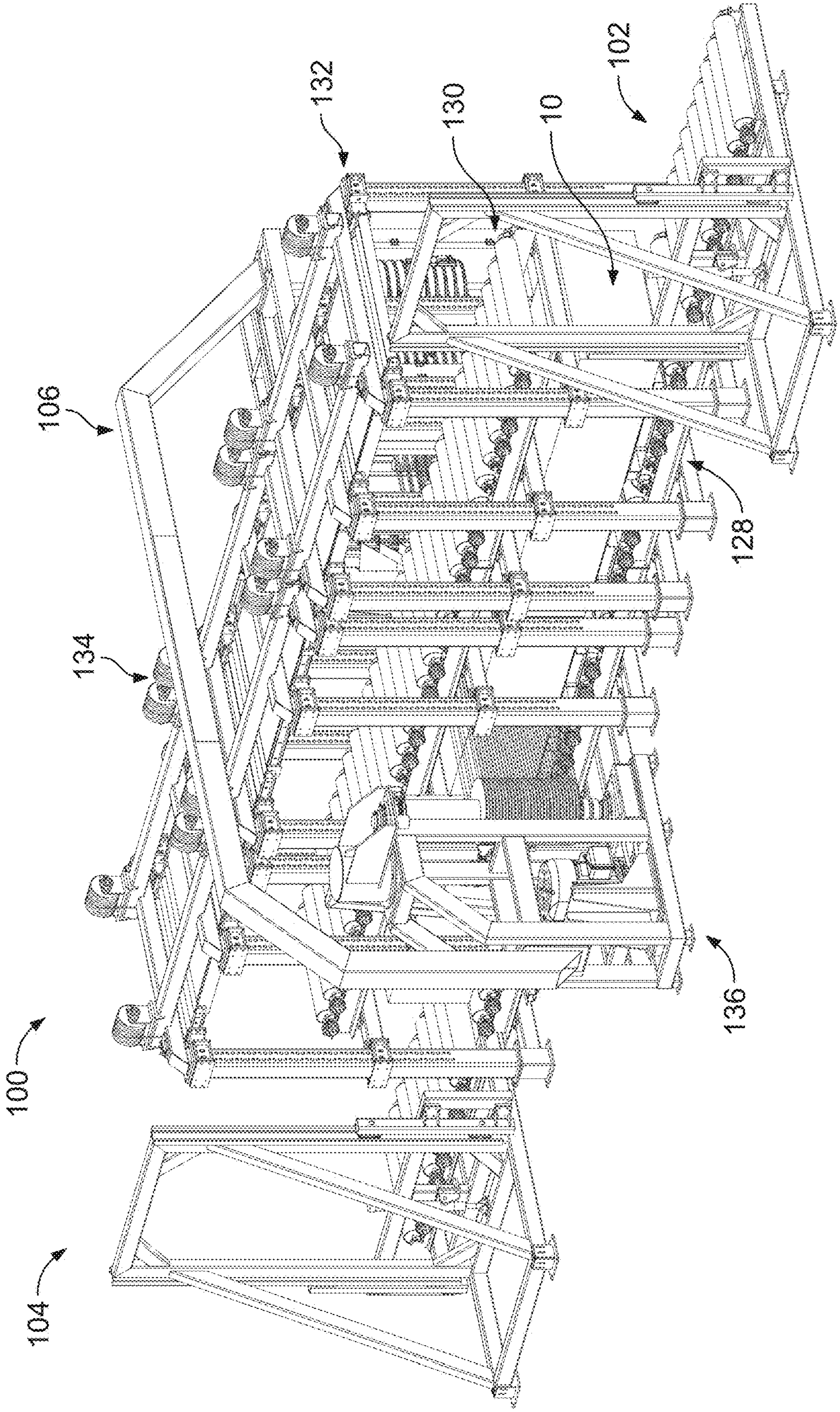
FIG. 3 is another perspective view of the stone cutting system of FIG. 1.
Figure 4:
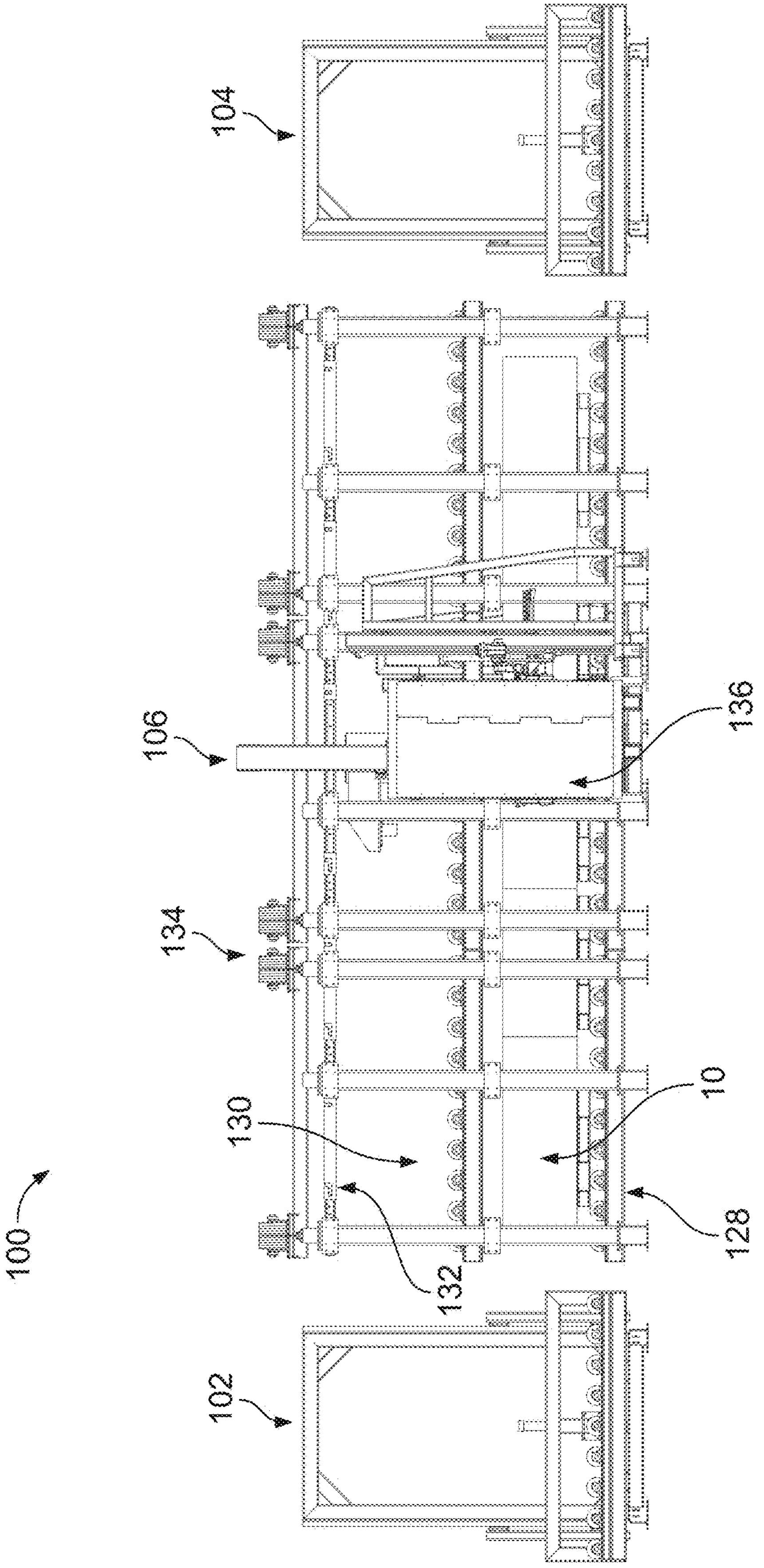
FIG. 4 is a side elevation view of the cutting stone system of FIG. 1.
Figure 5:
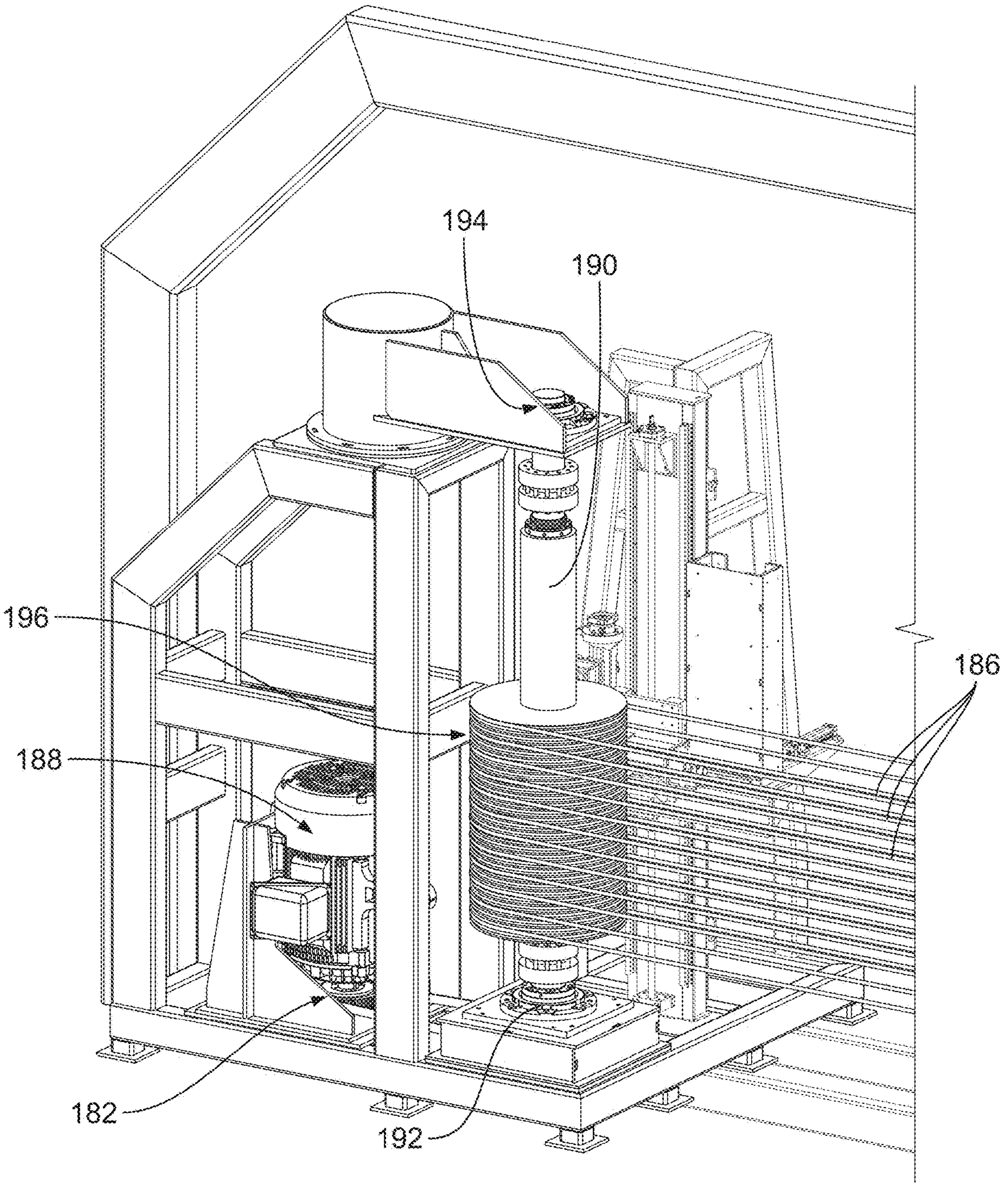
FIG. 5 is an enlarged perspective view of certain components of the stone cutting system of FIG. 1.
Figure 6:
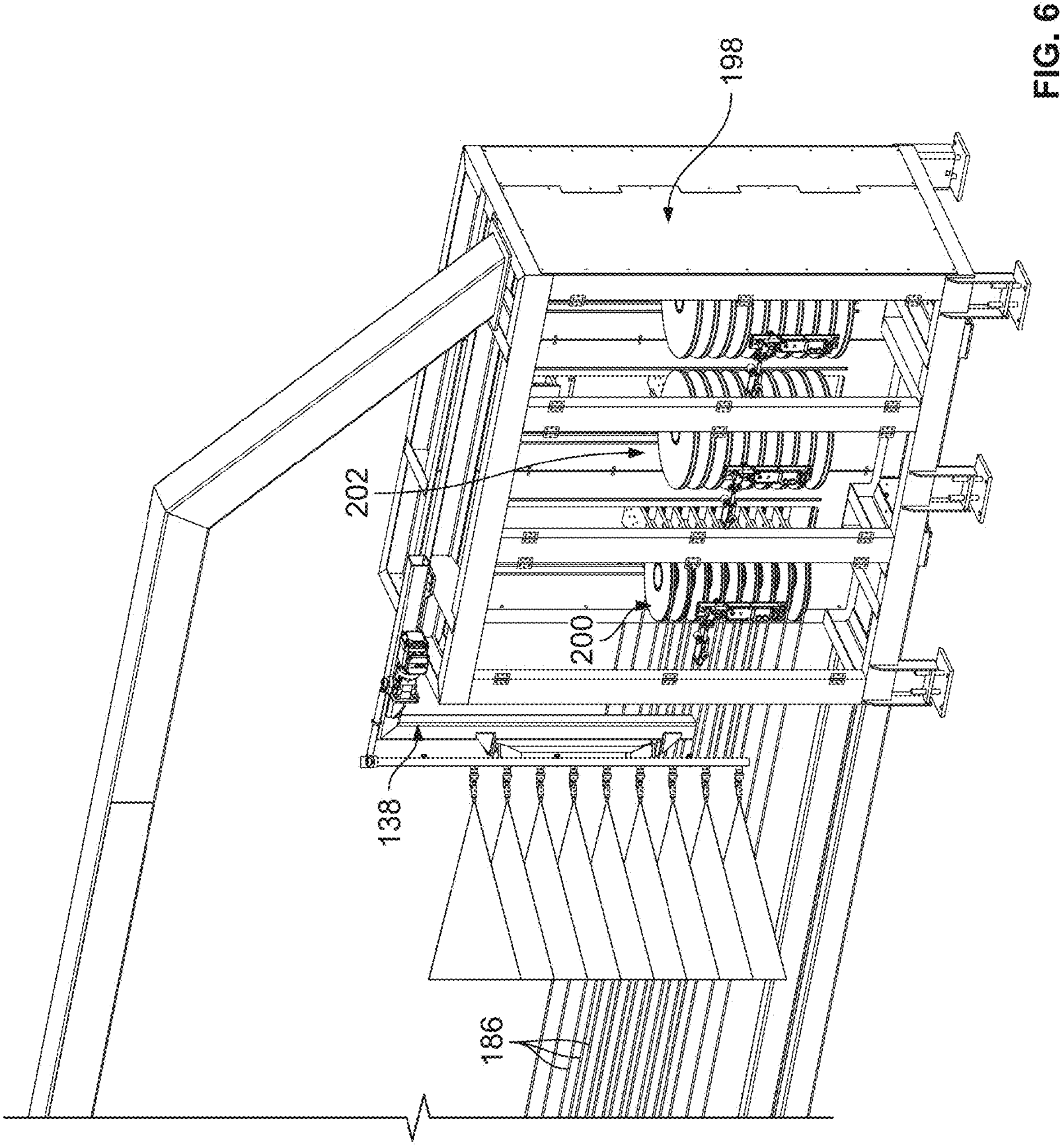
FIG. 6 is an enlarged perspective view of certain components of the stone cutting system of FIG. 1.
Figure 7:
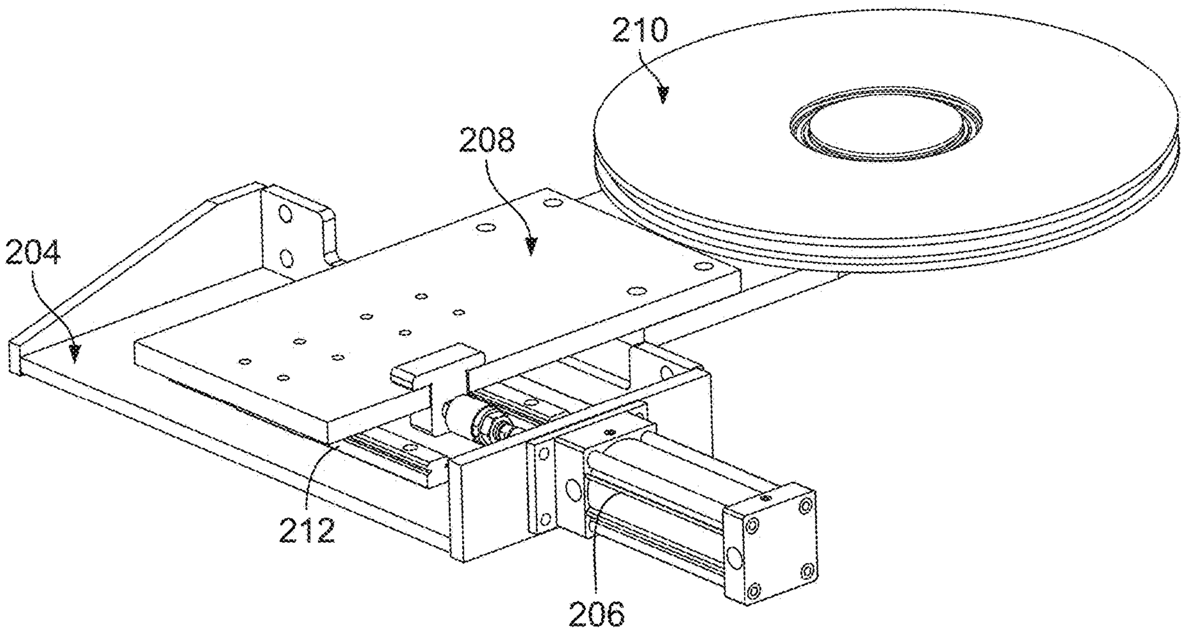
FIG. 7 is an enlarged perspective view of certain components of the stone cutting system of FIG. 1.
Figure 8:
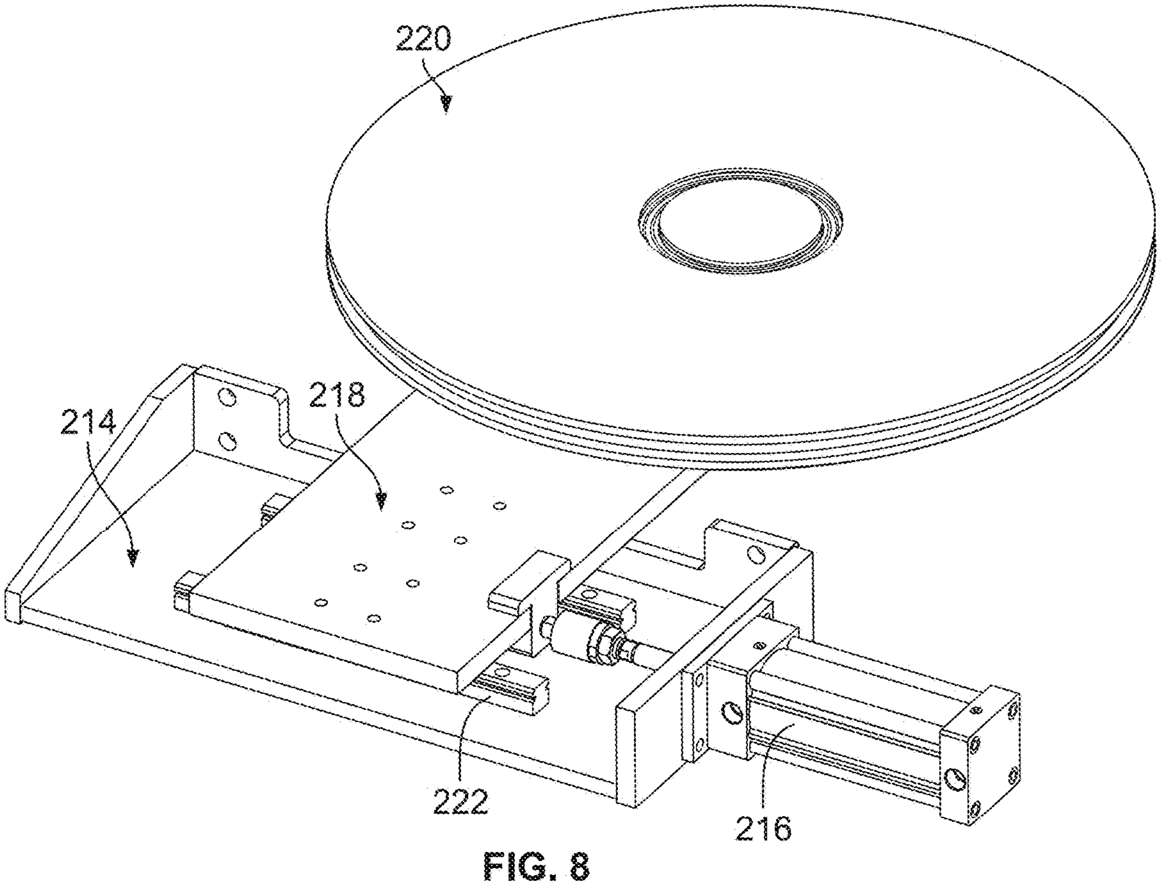
FIG. 8 is an enlarged perspective view of certain components of the stone cutting system of FIG. 1.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE INVENTION

The present invention is directed to material cutting systems for cutting units of input material. For illustrative purposes, a stone cutting system for cutting stone blocks will be described in detail, but it will be understood material input units may be stone blocks, slabs, wood logs, metal beams, or any other suitable units of material.

The following description and accompanying drawings will describe and illustrate a new horizontal, continuous-cut, multi-wire cutting system. The following description and accompanying drawings will further describe and illustrate a new multi-purpose cutting system configured to both cut large blocks of material and split slabs of material (i.e., dividing slabs in their shortest dimension via horizontal cuts). The following description and accompanying drawings will describe and illustrate a new multi-layer cutting system (configured to make a plurality of vertically-spaced horizontal cuts). The following description and accompanying drawings will describe and illustrate a new cutting system utilizing entirely horizontally-spinning cutting wire pulleys. The following description and accompanying drawings will describe and illustrate a new cutting system in which the cutting wires pass through kerfs in a cutting phase and pass through the kerfs again in a return phase for continuous cutting.

Figure 14:
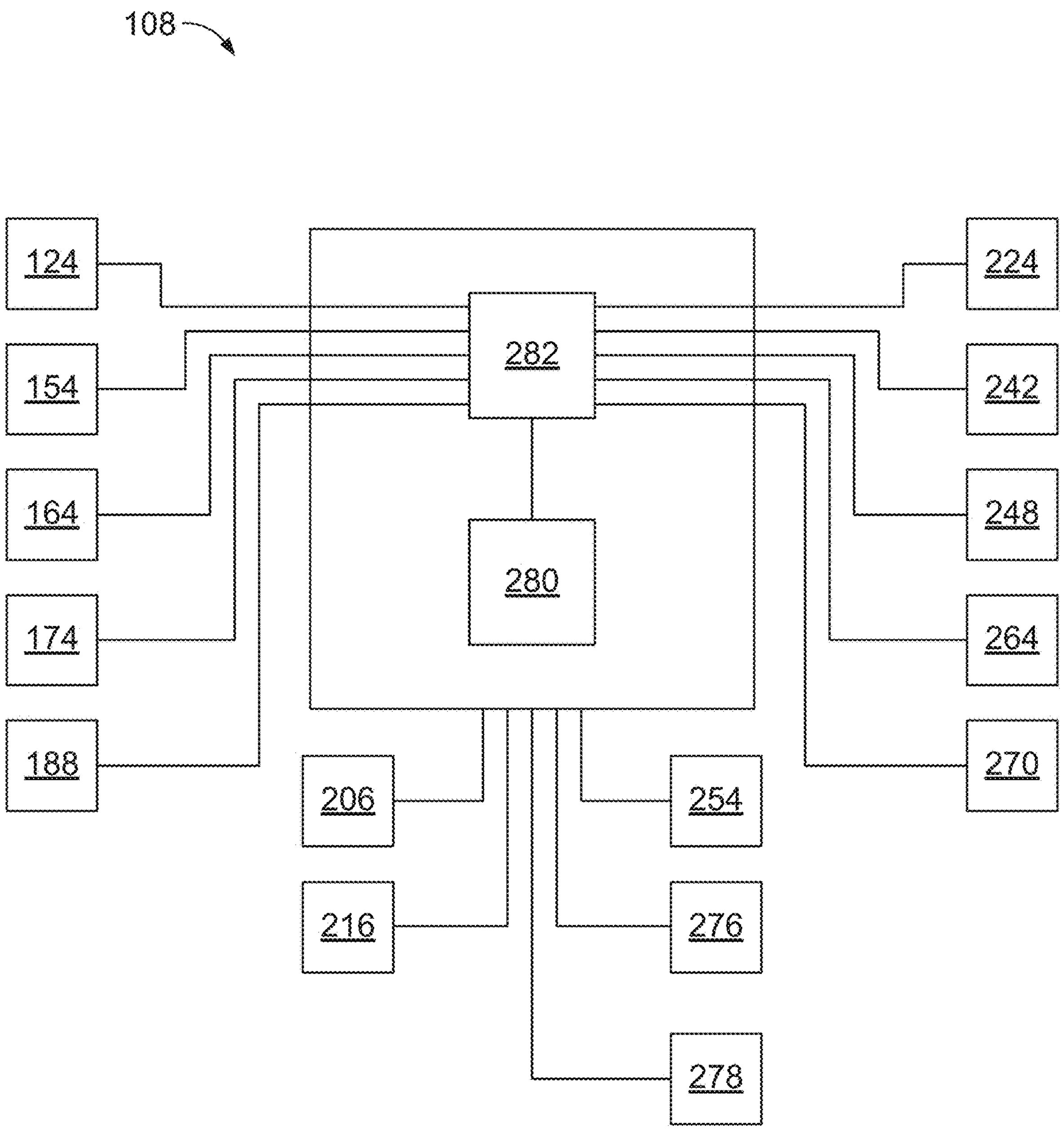
FIG. 14 is a schematic diagram of certain components of the stone cutting system of FIG. 1.

Turning now to FIGS. 1-4, a stone cutting system 100 constructed in accordance with an embodiment of the invention is illustrated. The stone cutting system 100 broadly comprises a loading lift 102, an unloading lift 104, a cutting station 106 positioned between the loading lift 102 and the unloading lift 104, and a control system 108 (FIG. 14).

The loading lift 102 elevates and aligns the blocks 10 for advancement to the cutting station 106 and may include a frame 110, a piston 112, and a carriage 114. The loading lift 102 may be substantially similar to unloading lift 104 described below except being positioned forward of the cutting station 106. The frame 110 supports the carriage 114 and may include left and right guides 116 for ensuring vertical movement of the carriage 114.

The piston 112 raises the carriage 114 via hydraulic pressure from a hydraulic system and may include a telescoping cylinder. The piston 112 may include safety features for preventing downward movement of the carriage 114 upon unexpected loss of hydraulic pressure.

The carriage 114 moves vertically relative to the frame 110 via the piston 112 for elevating blocks 10 to a desired cutting level. The carriage 114 may be aligned in the guides 116 for ensuring vertical movement of the carriage 114. The carriage 114 may include a plurality of rollers 120, a plurality of support bearings 118, a plurality of sprockets 122, and a drive motor 124.

The support bearings 118 may be mounted on the carriage 114 in opposing pairs for rotationally supporting the rollers 120.

The rollers 120 may extend horizontally to opposite sides of the carriage 114 and may be configured to rotate about their longitudinal axis to form a conveyor. At least some of the rollers 120 may be powered via the drive motor 124, while some of the rollers 120 may be idler (unpowered) rollers.

The sprockets 122 may be connected to powered ones of the rollers 120 for transferring power from the drive motor 124 to the powered rollers 120 via a drive chain. Alternatively, a belt, a drive shaft, or any other suitable drive train may be used. In one embodiment, the sprockets 122 allow a single drive motor to drive several powered rollers 120.

The drive motor 124 provides power to the powered rollers 120 via the sprockets 122. The drive motor 124 may be an AC motor, a DC motor, a servo, a solenoid, or the like.

The unloading lift 104 lowers the cut block sections from the cutting station 106. The unloading lift 104 may be substantially similar to the loading lift 102 except for its position aft of the cutting station 106 and thus will not be described further.

The cutting station 106 may be positioned between the lifts for cutting the blocks 10. The cutting station 106 may include a frame 126, a lower conveyor 128, a middle conveyor 130, an upper conveyor 132, a winch system 134, a cutting assembly 136, a spray system 138, and a shimming system 140.

The frame 126 supports the lower conveyor 128, the middle conveyor 130, and the upper conveyor 132. The frame 126 may include a plurality of holes 142 for securing the middle conveyor 130 and the upper conveyor 132 at selected heights via pins 144.

The lower conveyor 128 accommodates small to large sized blocks 10, such as blocks up to approximately five feet wide, up to approximately two and one half feet tall, and up to approximately eleven feet long. The lower conveyor 128 may include a skid 146, a plurality of support bearings 148, a plurality of rollers 150, a plurality of sprockets 152, and one or more drive motors 154.

The skid 146 supports the rollers 150 via the support bearings 148. To that end, the skid 146 extends longitudinally along a bottom of the frame 126.

The support bearings 148 may be mounted on the skid 146 in opposing pairs for rotationally supporting the rollers 150.

The rollers 150 extend laterally between the support bearings 148. The rollers 150 are configured to rotate about their longitudinal axis for advancing the blocks 10 along the cutting station 106. In one embodiment, some of the rollers 150 are idler (unpowered) rollers. In one embodiment, some of the rollers 150 are powered by the drive motor(s) 154 via the sprockets 152.

The sprockets 152 may be connected to powered ones of the rollers 150 for transferring power from the drive motor(s) 154 to the powered rollers 150 via a drive chain. Alternatively, a belt, a drive shaft, or any other suitable drive train may be used. In one embodiment, the sprockets 152 allow a single drive motor 154 to drive several powered rollers 150. Alternatively, each powered roller 150 may be driven by a dedicated motor 154.

The drive motor(s) 154 provides power to the powered rollers 150 via the sprockets 152. The drive motor(s) 154 may be an AC motor, a DC motor, a servo, a solenoid, or the like. In the case of multiple drive motors, each drive motor 154 may independently control different sets of powered rollers 150 to advance and adjust spacing between blocks 10 as needed.

The middle conveyor 130 accommodates small to medium sized blocks, such as blocks up to approximately five feet wide, up to approximately two and one half feet tall, and up to approximately seven feet long. The middle conveyor 130 may include a skid 156, a plurality of support bearings 158, a plurality of rollers 160, a plurality of sprockets 162, and one or more drive motors 164.

The skid 156 supports the support bearings 158 and rollers 160. To that end, the skid 156 extends longitudinally along a middle of the frame 126. The skid 156 may include holes 166 for securing the skid 156 at various heights on the frame 126 via pins 144.

The support bearings 158 may be mounted on the skid 156 in opposing pairs for rotationally supporting the rollers 160.

The rollers 160 extend laterally between the support bearings 158. The rollers 160 are configured to rotate about their longitudinal axis for advancing the blocks along the cutting station 106. In one embodiment, some of the rollers 160 are idler (unpowered) rollers. In one embodiment, some of the rollers 160 are powered by the drive motor(s) 164 via the sprockets 162.

The sprockets 162 may be connected to powered ones of the rollers 160 for transferring power from the drive motor(s) 164 to the powered rollers 160 via a drive chain. Alternatively, a belt, a drive shaft, or any other suitable drive train may be used. In one embodiment, the sprockets 162 allow a single drive motor 164 to drive several powered rollers 160. Alternatively, each powered roller 160 may be driven by a dedicated motor 164.

The drive motor(s) 164 provides power to the powered rollers 160 via the sprockets 162. The drive motor(s) 164 may be an AC motor, a DC motor, a servo, a solenoid, or the like. In the case of multiple drive motors, each drive motor 164 may independently control different sets of powered rollers 160 to advance and adjust spacing between blocks as needed.

The upper conveyor 132 accommodates small sized blocks, such as blocks up to approximately five feet wide, up to approximately one half feet tall, and up to approximately seven feet long. The upper conveyor 132 may be particularly suitable for splitting slabs (i.e., dividing slabs in their shortest dimension via horizontal cuts). The upper conveyor may include a skid 168, a plurality of rollers 170, a plurality of belts 172, and one or more drive motors 174.

The skid 168 supports the rollers 170 and belts 172. To that end, the skid 168 extends longitudinally along an upper portion of the frame 126. The skid 168 may include holes 176 for securing the skid 168 at various heights on the frame 126 via pins 144.

The rollers 170 extend laterally between beams of the skid 168. The rollers 170 may be configured to rotate about their longitudinal axis for advancing the blocks along the cutting station 106. In one embodiment, some of the rollers 170 are idler (unpowered) rollers. In one embodiment, some of the rollers 170 are powered by the drive motor(s) 174.

The belts 172 may be positioned between some of the rollers 170 and may be configured to advance the blocks along the cutting station along with the rollers 170. The belts may be powered by the drive motor(s) 174.

The drive motor(s) 174 provides power to the powered rollers 170 or the powered belts 172. The drive motor(s) 174 may be an AC motor, a DC motor, a servo, a solenoid, or the like. In the case of multiple drive motors, each drive motor 174 may independently control different sets of powered rollers 170 or powered belts 172 to advance and adjust spacing between blocks as needed.

The winch system 134 selectively raises the middle conveyor 130 and the upper conveyor 132. To that end, the winch system 134 may include a plurality of winches 178 and a plurality of cables 180.

The winches 178 may be mounted on a top of the frame 126 and may be configured to retract and extend the cables 180 for raising and lowering the middle conveyor 130 and upper conveyor 132. The winches 178 may be spaced apart from each other (e.g., one on each vertical beam) for evenly distributing lifting force to the middle conveyor 130 or upper conveyor 132.

The cables 180 extend downward from the winches 178 and are configured to be removably secured to the middle conveyor 130 and upper conveyor 132 for selectively lifting or lowering the middle conveyor 130 and upper conveyor 132. The cables 180 may be configured to be retracted into the winches 178 when not in use.

Turning to FIGS. 5-8, the cutting assembly 136 cuts the stone blocks 10 and may include a drive train 182, a tensioning system 184, and a plurality of cutting wires 186.

The drive train 182 actuates the cutting wires 186 and may include a drive motor 188, a driveshaft 190, a base bearing 192, a pivot bearing 194, and a plurality of drive pulleys 196.

The drive motor 188 provides power to the drive pulleys 196 via the driveshaft 190. The drive motor 188 may be an AC motor, a DC motor, or the like.

The driveshaft 190 rotates under power from the drive motor 188 and may be configured to rotate the plurality of drive pulleys 196. The driveshaft 190 may have sufficient length to accommodate the drive pulleys 196 at a range of vertical spacing.

The base bearing 192 rotatably supports the driveshaft 190. The base bearing 192 may be unmovably secured near the drive motor 188.

The pivot bearing 194 rotatably guides the driveshaft 190 opposite the base bearing 192. The pivot bearing 194 may be configured to pivot out of alignment with the driveshaft 190 so that the drive pulleys 196 may be added to or removed from the driveshaft 190 depending on the number of drive pulleys needed.

The drive pulleys 196 may be positioned on the driveshaft 190 and may have the cutting wires 186 entrained thereon such that rotation of the drive pulleys 196 cycles the cutting wires 186. The drive pulleys 196 may be configured to be spaced along the driveshaft 190 from each other according to desired cut spacing (down to approximately two centimeters in one embodiment). In one embodiment, all of the drive pulleys 196 are oriented substantially horizontally, the purpose of which will be described below.

The tensioning system 184 retains tension in the cutting wires 186 and may include a cabinet 198, a plurality of first pulley assemblies 200, and a plurality of second pulley assemblies 202.

The cabinet 198 may house the first pulley assemblies 200 and the second pulley assemblies 202. The cabinet may include a plurality of access doors for reconfiguring or performing maintenance on the tensioning system 184.

The first pulley assemblies 200 tension some of the cutting wires 186 and each include a bracket 204, a pneumatic piston 206, an offset mounting arm 208, and a tension pulley 210. The first pulley assemblies 200 may be positioned in a forward pulley column in the cabinet 198.

The bracket 204 supports the pneumatic piston 206, the offset mounting arm 208, and the tension pulley 210. The bracket 204 may include rails 212 on which the offset mounting arm 208 travels. The bracket 204 may be adjustably mounted inside the cabinet 198.

The pneumatic piston 206 may be configured to bias the offset mounting arm 208 and hence the tension pulley 210 by a controlled amount. To that end, the pneumatic piston 206 may be configured to engage the offset mounting arm 208 and may be connected to a pneumatic pressure system. The pneumatic pressure system may include air pressure regulators and manifolds for supplying controlled air pressure to the pneumatic piston 206. The pneumatic pressure system may also include flow controls to ensure the pneumatic piston 206 is safely restrained if a wire breaks thereby suddenly releasing compression on the pneumatic piston 206.

The offset mounting arm 208 may slideably engage the rails 212 and may support the tension pulley 210. The offset mounting arm 208 may be engaged by the pneumatic piston 206 for exerting tension on the corresponding cutting wire 186 via the corresponding tension pulley 210. The offset mounting arm 208 has an offset that allows for down to approximately two centimeter cut spacing between cutting wires 186.

The tension pulley 210 may be rotatably positioned on a distal end of the offset mounting arm 208 for exerting tension on the corresponding cutting wire 186 as the cutting wire 186 is cycled. The tension pulley 210 may be approximately eighteen inches in diameter, although other diameter pulleys may be used. In one embodiment, all of the tension pulleys 210 are oriented substantially horizontally, the purpose of which will be described below.

The second pulley assemblies 202 tension additional cutting wires 186 and include a bracket 214, a pneumatic piston 216, a straight mounting arm 218, and a tension pulley 220. The second pulley assemblies 202 may be positioned in a middle pulley column and/or an aft pulley column in the cabinet 198.

The bracket 214 supports the pneumatic piston 216, the straight mounting arm 218, and the tension pulley 220. The bracket 214 may include rails 222 on which the straight mounting arm 218 travels. The bracket 214 may be adjustably mounted inside the cabinet 198.

The pneumatic piston 216 may be configured to bias the straight mounting arm 218 and hence the tension pulley 220 by a controlled amount. To that end, the pneumatic piston 216 may be configured to engage the straight mounting arm 218 and may be connected to the pneumatic pressure system. The pneumatic pressure system may include air pressure regulators and manifolds for supplying controlled air pressure to the pneumatic piston 216. The pneumatic pressure system may also include flow controls to ensure the pneumatic piston 216 is safely restrained if a wire breaks thereby suddenly releasing compression on the pneumatic piston 216.

The straight mounting arm 218 may slideably engage the rails 222 and may support the tension pulley 220. The straight mounting arm 218 may be engaged by the pneumatic piston 216 for exerting tension on the corresponding cutting wire 186.

The tension pulley 220 may be rotatably positioned on a distal end of the straight mounting arm 218 for exerting tension on the corresponding cutting wire 186 as the cutting wire 186 is cycled. The tension pulley 220 may be approximately twenty-four inches in diameter, although other diameter pulleys may be used. In one embodiment, all of the tension pulleys 220 are oriented substantially horizontally, the purpose of which will be described below.

The cutting wires 186 extend across the cutting station 106 and may include diamond teeth or teeth of other hard materials. The cutting wires 186 loop between the drive pulleys 196 of the drive train 182 and the tension pulleys 210, 220 of the tensioning system 184. As many as thirty cutting wires 186 may be used at a time.

Figure 9:
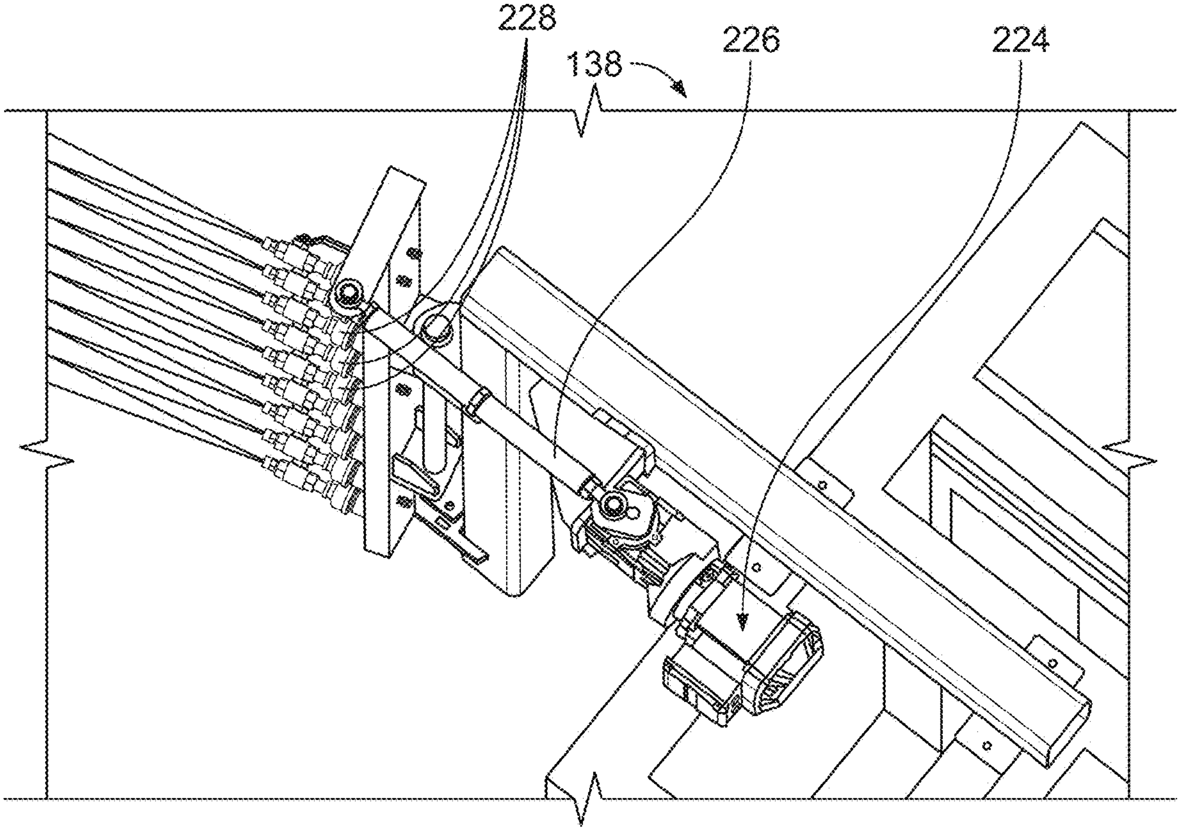
FIG. 9 is an enlarged perspective view of certain components of the stone cutting system of FIG. 1.
Figure 10:
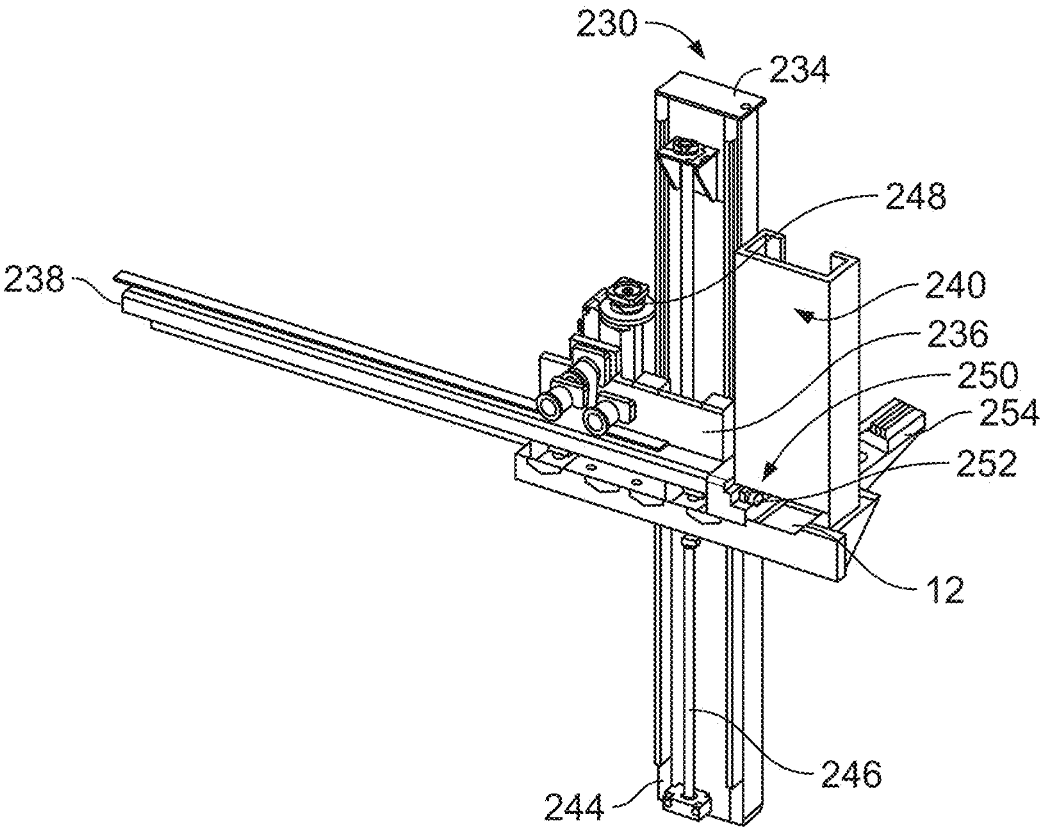
FIG. 10 is an enlarged perspective view of certain components of the stone cutting system of FIG. 1.
Figure 11:
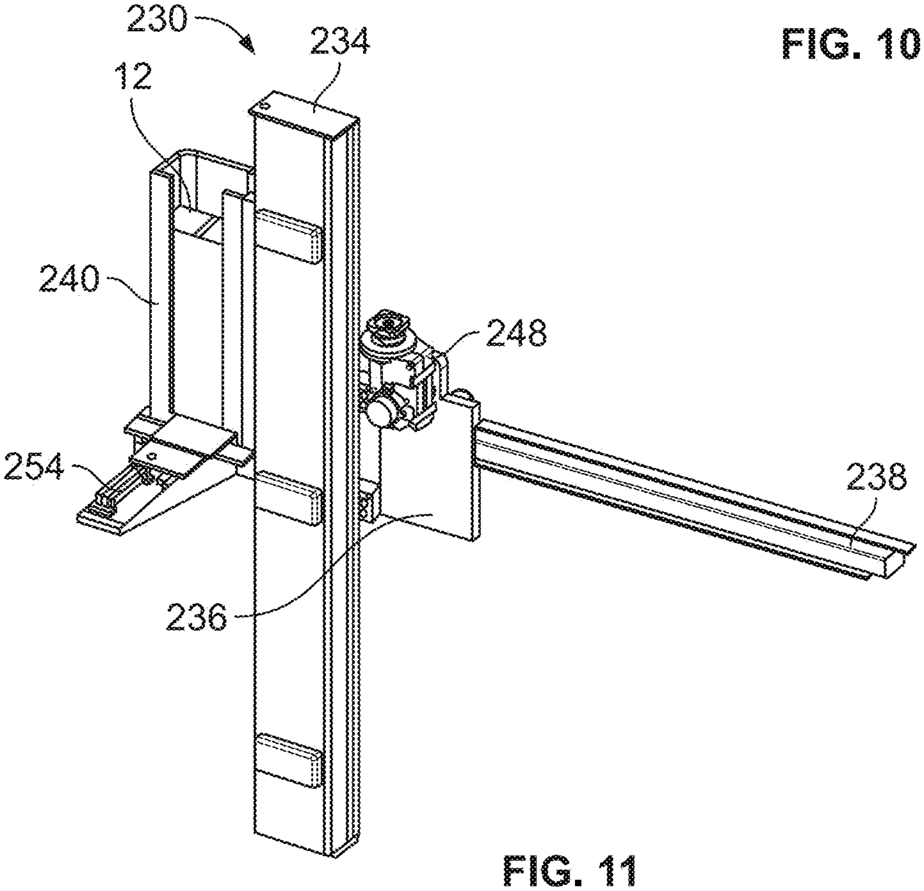
FIG. 11 is an enlarged perspective view of certain components of the stone cutting system of FIG. 1.
Figure 12:
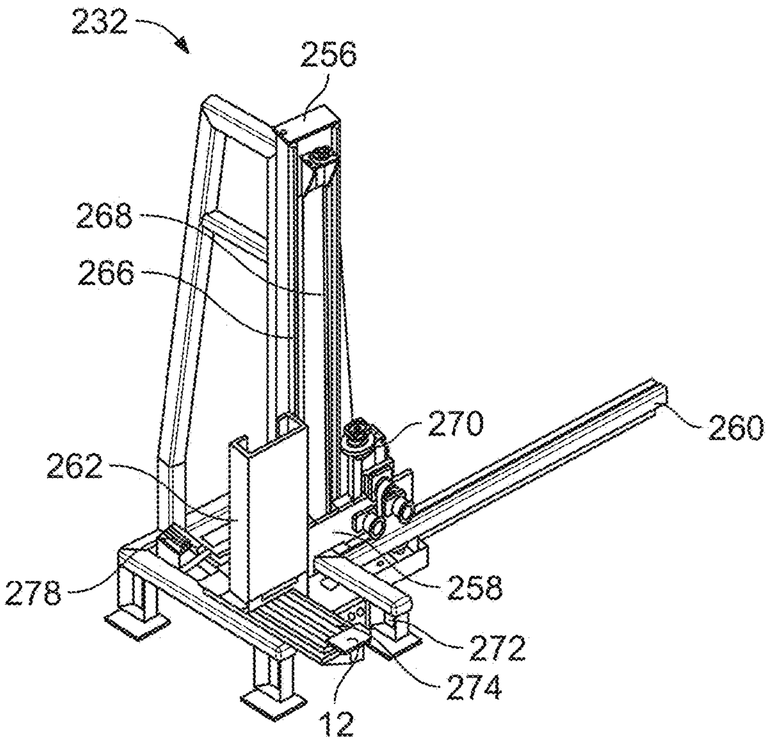
FIG. 12 is an enlarged perspective view of certain components of the stone cutting system of FIG. 1.
Figure 13:
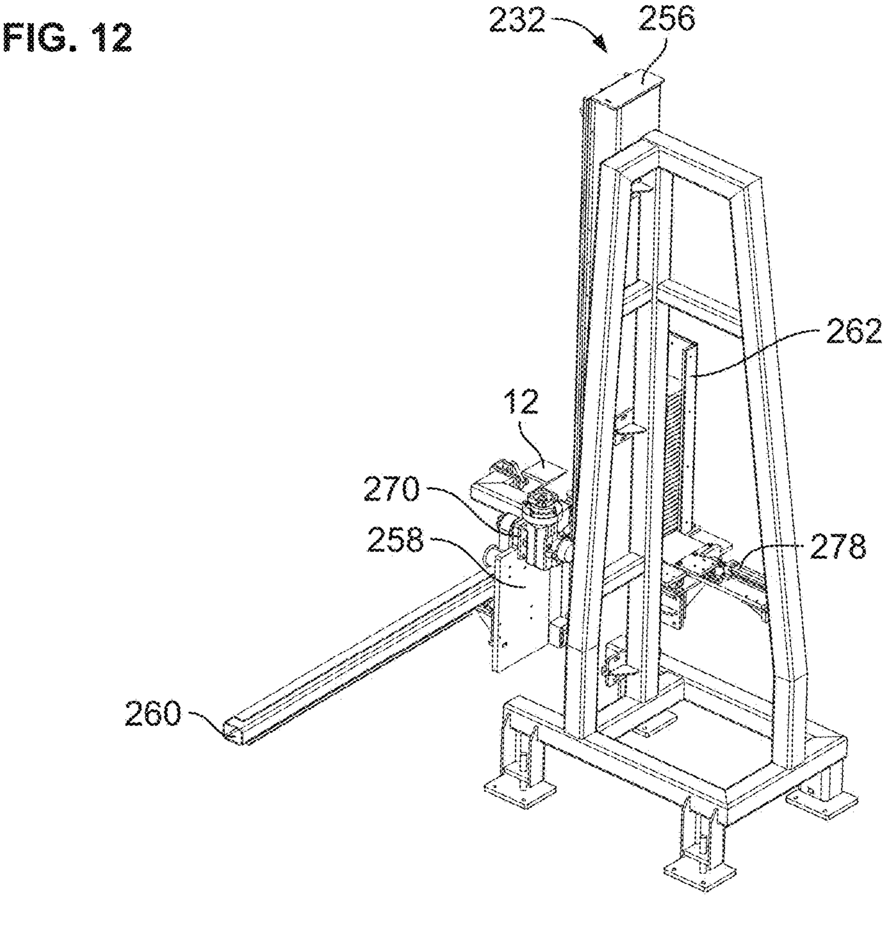
FIG. 13 is an enlarged perspective view of certain components of the stone cutting system of FIG. 1.

Turning to FIG. 9, the spray system 138 cools the cutting wires 186 and the cut block sections and may include a motor 224, a drive linkage 226, and a plurality of nozzles 228.

The motor 224 actuates the drive linkage 226 and hence the nozzles 228. To that end, the motor 224 may be communicatively coupled to the control system 108. The motor 224 may be an AC motor, a DC motor, a servo, a solenoid, or the like.

The drive linkage 226 converts actuation from the motor 224 to oscillation or other movement of the nozzles 228. The drive linkage 226 may be adjustable for changing the movement of the nozzles 228. For example, oscillation can be broadened or tightened, realigned, or the like.

The nozzles 228 deliver water or other liquid to the cutting wires 186 and the stone blocks 10 near the kerfs created by the cutting wires 186 for cooling the cutting wires 186 and stone blocks 10. To that end, the nozzles 228 may create a spray pattern or spray jet, which may be adjustable. The nozzles 228 may be configured to move or oscillate via the motor 224 and the drive linkage 226. In one embodiment, the nozzles 228 may be positioned in a vertical array.

Turning to FIGS. 10-13, the shimming system 140 inserts shims 12 into kerfs between cut block sections and may include a straight shimming module 230 and an offset shimming module 232. The shimming system 140 may be positioned aft of the cutting assembly 136 and the spray system 138.

The straight shimming module 230 inserts shims 12 from the drive motor 188 side of the cutting station 106. The straight shimming module 230 may include a post 234, a carriage 236, an arm 238, and a magazine 240.

The post 234 may raise and lower the carriage 236. To that end, the post 234 may include a motor 242, rails 244, and a screw 246.

The motor 242 may be servo, a solenoid, or the like. The control system 108 may be configured to monitor a position of the carriage 236 via the motor 242.

The rails 244 may extend vertically for guiding the carriage 236 and may be rods, guards, or the like. In one embodiment, the post 234 includes left and right rails 244.

The screw 246 may extend vertically parallel to the rails 244. The screw 246 may have helical threads configured to engage complementary helical threads of the carriage 236 such that rotation of the screw 246 raises or lowers the carriage 236.

The carriage 236 may support the arm 238 and may include a motor 248 for actuating the arm 238. The carriage 236 may be raised and lowered on the post 234 for vertically positioning the arm 238 at a proper height to insert a shim 12 into a kerf between cut block sections.

The motor 248 may be servo, a solenoid, or the like. The control system 108 may be configured to monitor a position of the arm 238 via the motor 248.

The arm 238 may support the magazine 240 and may include tray 250 positioned on its distal end. The tray 250 may be configured to receive shims 12 for inserting into the kerfs between cut block sections. The tray 250 may include a holder 252 configured to retain a shim 12 in the tray 250. The holder 252 may be biased such as via a spring to exert a small force on a shim 12 in the tray 250.

The magazine 240 may retain a supply (e.g., stack) of shims 12 for deployment. To that end, the magazine 240 may include a top opening for inserting the supply of shims 12 and a smaller lower opening for dispensing shims 12, one at a time, to the tray 250. The magazine 240 may also include a pneumatic cylinder 254 for urging a shim 12 from the magazine 240 to the tray 250. Alternatively, a servo, a solenoid, or other motor may be used.

The offset shimming module 232 inserts shims 12 from the tensioning system 184 side of the cutting station 106. The offset shimming module 232 may include a post 256, a carriage 258, an arm 260, and a magazine 262.

The post 256 may raise and lower the carriage 258. To that end, the post 256 may include a motor 264, rails 266, and a screw 268.

The motor 264 may be servo, a solenoid, or the like. The control system 108 may be configured to monitor a position of the carriage 258 via the motor 264.

The rails 266 may extend vertically for guiding the carriage 258 and may be rods, guards, or the like. In one embodiment, the post 256 includes left and right rails 266.

The screw 268 may extend vertically parallel to the rails 266. The screw 268 may have helical threads configured to engage complementary helical threads of the carriage 258 such that rotation of the screw 268 raises or lowers the carriage 258.

The carriage 258 may support the arm 260 and may include a motor 270 for actuating the arm 260. The carriage 258 may be raised and lowered on the post 256 for vertically positioning the arm at a proper height to insert a shim 12 into a kerf between cut block sections.

The motor 270 may be servo, a solenoid, or the like. The control system 108 may be configured to monitor a position of the arm 260 via the motor 270.

The arm 260 may support the magazine 262 and may include tray 272 positioned on its distal end. The tray 272 may be configured to receive shims 12 for inserting into the kerfs between cut block sections. The tray 272 may include a holder 274 configured to retain a shim 12 in the tray 272. The holder 274 may be biased such as via a spring to exert a small force on a shim 12 in the tray 272.

The magazine 262 may retain a supply (e.g., stack) of shims 12 for deployment. To that end, the magazine 262 may include a top opening for inserting the supply of shims 12 and a smaller lower opening for dispensing shims 12, one at a time, to the tray 272. The magazine 262 may also include a pneumatic cylinder 276 for moving the magazine 262 relative to the tray 272 and a pneumatic cylinder 278 for urging a shim 12 from the magazine 262 to the tray 272. Alternatively, servos, solenoids, or other motors may be used.

Turning to FIG. 14, the control system 108 controls operation of the stone cutting system 100 via the above-described motors 124, 154, 164, 174, 188, 224, 242, 248, 264, and 270, and pneumatic cylinders 206, 216, 254, 276, and 278 (directly or indirectly). To that end, the control system 108 may include a memory 280 and a processor 282. The control system 108 may be implemented with hardware, software, firmware, or a combination thereof. The control system 108 may also include conventional input devices such as knobs, buttons, switches, dials, etc.; inputs for receiving programs and data from external devices; one or more displays; a cellular or other radio transceiver for wirelessly receiving and transmitting data from and to remote devices; a Bluetooth transceiver; a WiFi transceiver; and/or other electronic components.

Some of the control functions described herein may be implemented with one or more computer programs executed by the processor 282. Each computer program comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device including, but not limited to, the memory 280. The computer-readable medium can be, for example, but not limited to, an electronic, magnetic, optical, electro-magnetic, infrared, or semiconductor system, apparatus, device, or propagation medium. More specific, although not inclusive, examples of the computer-readable medium would include the following: an electrical connection having one or more wires, a random access memory (RAM), a read-only memory (ROM), an erasable, programmable, read-only memory (EPROM or Flash memory), an optical fiber, and a portable compact disk read-only memory (CDROM).

The memory 280 may be any electronic memory that can be accessed by the processor 282 and operable for storing instructions or data. The memory 280 may be integral with the processor 282 or may be external memory accessible by the computing device. The memory may be a single component or may be a combination of components that provide the requisite functionality. The memory may include various types of volatile or non-volatile memory such as flash memory, optical discs, magnetic storage devices, SRAM, DRAM, or other memory devices capable of storing data and instructions. The memory may communicate directly with the computing device or may communicate over a bus or other mechanism that facilitates direct or indirect communication. The memory may optionally be structured with a file system to provide organized access to data existing thereon.

The components of the stone cutting system 100 illustrated and described herein are merely examples of equipment that may be used to implement embodiments of the present invention and may be replaced with other equipment without departing from the scope of the present invention. Some of the illustrated components of the system 10 may also be combined.

Figure 15:
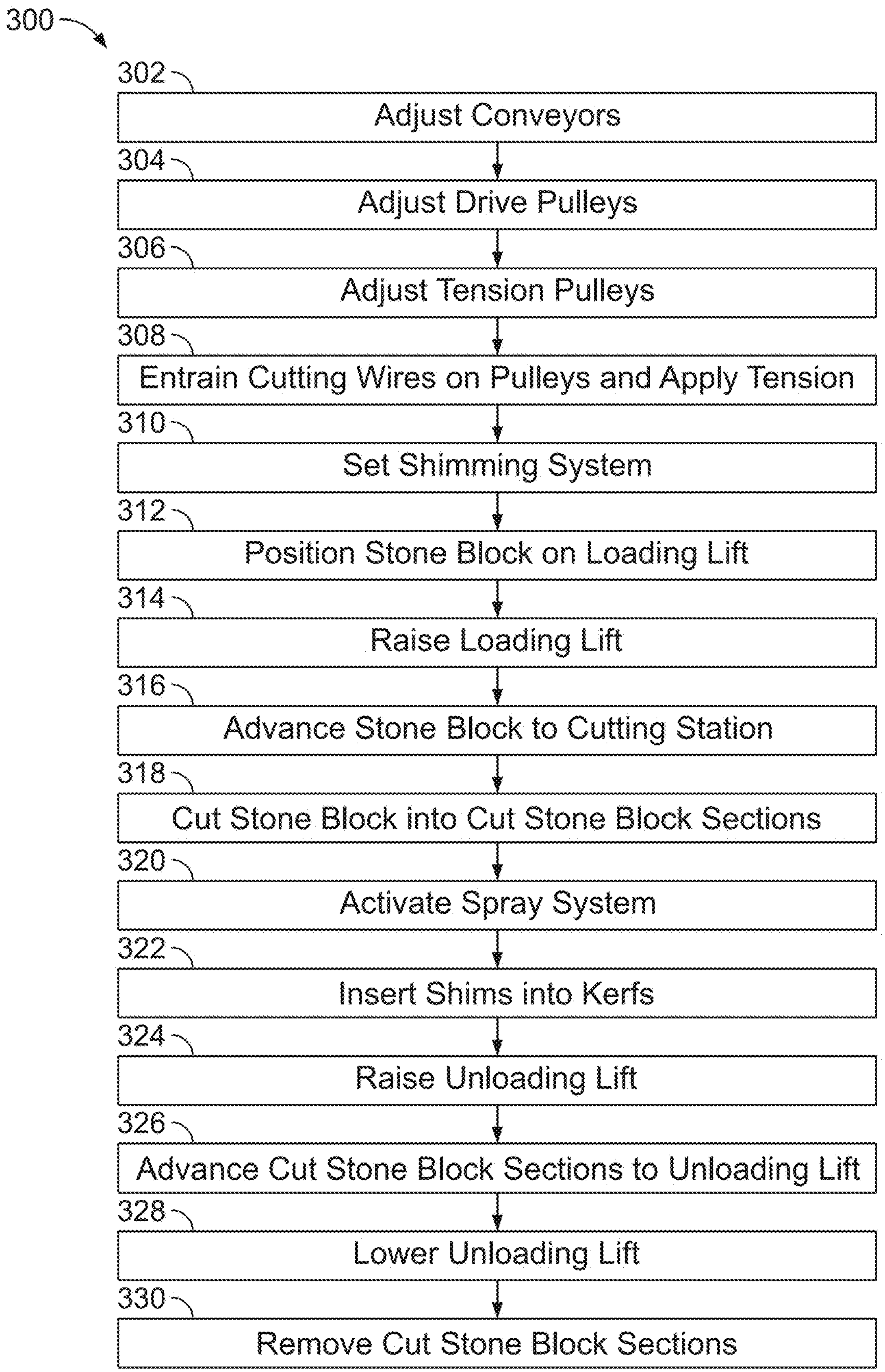
FIG. 15 is a flow diagram of certain steps of a method of cutting stone blocks via the stone cutting system of FIG. 1 in accordance with another embodiment of the invention.

Turning to FIG. 15, a method 300 of cutting stones via the stone cutting system 100 will now be described in detail. First, the middle conveyor 130 and the upper conveyor 132 should be adjusted vertically via the winch system 134 according to the sizes of the stone blocks and the spacing of the intended cuts, as shown in block 302. For example, the middle conveyor 130 may be raised to accommodate large stone blocks 10 on the lower conveyor 128. The middle conveyor 130 and the upper conveyor 132 may be secured in place on the frame 126 by inserting the pins 144 into the holes 142 of the frame 126 and holes 166, 176.

The drive pulleys 196 may then be vertically spaced on the driveshaft 190 according to the vertical position and vertical spacing (down to approximately two centimeters) of the intended cuts, as shown in block 304. To that end, the pivot bearing 194 may be pivoted off the driveshaft 190, and the drive pulleys 196 may be rearranged on the driveshaft 190 with spacers to effect the desired spacing. The pivot bearing 194 may then be pivoted onto the driveshaft 190.

Similarly, the tension pulleys 210, 220 may be vertically spaced on in the cabinet 198 to match the vertical spacing of the drive pulleys 196, as shown in block 306. The tension pulleys 210, 220 may also be mounted in the forward pulley column, the middle pulley column, or the aft pulley column as needed to achieve the desired vertical spacing between the cutting wires 186.

The cutting wires 186 may then be trained on the drive pulleys 196 and tension pulleys 210, 220, as shown in block 308. Tension may then be applied invidually to the cutting wires 186 by activating the pneumatic pistons 206, 216. As many as thirty cutting wires 186 may be used at a time.

The shimming system 140 may also be set according to desired cut spacing, as shown in block 310. To that end, the motors 242, 264 may be activated to raise the carriages 236, 258 until shims 12 loaded in the trays 250, 272 are vertically level with the lowest cutting wire 186. This height may be saved in the memory 280. The motors 242, 264 may then be activated to raise the carriages 236, 258 until the shims 12 loaded in the trays 250, 272 are vertically level with the next lowest cutting wire 186. This height may similarly be saved in the memory 280. This may be repeated until heights associated with each cutting wire 186 are saved in the memory 280.

A stone block may then be positioned on the loading lift 102, and specifically on the rollers 120 of the loading lift 102, via a forklift, as shown in block 312. To that end, the stone blocks should be initially placed on a pallet for manipulation by the forklift.

The loading lift 102 may then raise the stone block to the height of the intended conveyor (lower conveyor 128, middle conveyor 130 or upper conveyor 132) via the piston 112, as shown in block 314. In one embodiment, the loading lift 102 in its lowest position is at the same height as the lower conveyor 128 and thus does not need to be activated for use of the lower conveyor 128.

The motor(s) 124 may then be activated to drive the rollers 120 and hence advance the stone block to the cutting station 106, as shown in block 316. The motor(s) 154 of the lower conveyor 128 may also be activated to drive the rollers 150 and hence further advance the stone block to the cutting wires 186. The motors 124, 154 may be activated independently and at different speeds to control spacing of stone blocks passing through the stone cutting system 100.

The cutting wires 186 may then cut through the stone block to make multiple horizontal, vertically spaced kerfs, as shown in block 318. A speed of the drive motor 188 may be increased or decreased to change the speed of the cuts as needed. The cutting wires 186 may pass through the kerfs in a first direction in a cutting phase (i.e., as the cutting wires 186 remove material), turn around some of the pulleys, pass through the kerfs in a second direction opposite the first direction in a return phase, and turn around opposing pulleys thereby entering the cutting phase again. In this way, the cutting wires 186 continuously cycle around the pulleys and continuously cut the stone block (as opposed to a reciprocating blade, for example) without the cutting wires 186 needing to be long enough to encircle the stone block. Furthermore, the cutting wires 186 passing through the kerfs in the return phase allows the stone block (or more specifically, the cut block sections) to continue traversing past the cutting wires 186 on the rollers 120 such that additional stone blocks may be cut in a continuous cutting operation.

The spray system 138 may also spray cooling water or other cooling fluid onto the cutting wires 186 and kerfs of the cut block sections via the nozzles 228, as shown in block 320. Oscillation of the nozzles 228 may also be adjusted to optimize cooling or water/fluid usage.

Shims 12 may then be inserted into the kerfs via the shimming system 140, as shown in block 322. To that end, the motors 242, 264 may be activated to raise the carriages 236, 258 and hence the shims 12 loaded in the trays 250, 272 to one of the saved heights. The motors 248, 270 may then be activated to propel the arms 238, 260 and hence the shims 12 towards the corresponding kerf until the shims 12 are wedged into the kerfs. The motors 248, 270 may then be activated to retract the arms 238, 260. Because the magazine 262 of the offset shimming module 232 is normally offset from the tray 272, the pneumatic cylinder 276 may then be activated to draw the magazine 262 toward the tray 272. The pneumatic cylinders 254, 278 may then be activated to load shims 12 from the magazines 240, 262 onto the trays 250, 272. The pneumatic cylinder 276 may then be activated the retract the magazine 262. The motors 242, 264 may then be activated to raise the carriages 236, 258 and hence the newly loaded shims 12 to another one of the saved heights. The above may be repeated until shims 12 are inserted into all kerfs such that the stone block has been cut into cut stone sections separated by shims 12.

The unloading lift 104 may then be raised to a height of the conveyor being used, for receiving the cut stone sections, as shown in block 324. In the case of the lower conveyor 128, the unloading lift 104 may be in its lowest position.

The cut stone sections of the stone block may then be advanced to the unloading lift 104, as shown in block 326. A drive motor of the unloading lift 104 may help propel the cut stone sections fully onto the unloading lift 104.

The unloading lift 104 may then be lowered to its lowest position for unloading the cut stone sections, as shown in block 328. If the lower conveyor 128 is being used, the unloading lift 104 may already be its lowest position and thus does not need to be lowered.

The cut stone sections may then be removed from the unloading lift 104 via a forklift, as shown in block 330.

As soon as the stone block has been advanced to the cutting station 106 (block 316), an additional stone block may be loaded onto the loading lift 102. The additional stone block may be advanced simultaneously with or independently from the initial stone block as needed. In this way, several stone blocks may be cut in quick succession. For example, cut stone sections of one stone block may be advanced to the unloading lift 104 and unloaded therefrom while a subsequent stone block is being cut and yet a further subsequent stone block is being loaded on to the loading lift 102 and raised to the desired conveyor. The cutting station 106 may also be sufficiently long to handle up to approximately three stone blocks simultaneously. Furthermore, additional stone blocks being advanced by an advancing force (via drive motors) may provide a backforce against the stone block being cut, thereby preventing slippage or otherwise improving a quality of cut.

The above-described invention provides several advantages. For example, the cutting system 100 makes several cuts into stone blocks simultaneously, prepares additional stone blocks for cutting, and handles cut block sections in a seamless progression. This increases output rate by minimizing handling and processing time. The cutting system 100 also automatically inserts shims 12 between cut block sections. Furthermore, the cutting system 100 is fully adjustable. For example, cut spacing may be as little as approximately two centimeters. Up to thirty cutting wires 186 may be used for making up to thirty cuts, and hence thirty-one cut block sections, in one pass. In addition, the lower conveyor 128, middle conveyor 130, and upper conveyor 132 can handle a wide range of block sizes.

The cutting system 100 also provides horizontal, continuous-cut, multi-wire cutting. The cutting system 100 also is configured to both cut large blocks of material and split slabs of material (i.e., dividing slabs in their shortest dimension). The cutting system 100 provides multi-layer cutting (i.e., to make a plurality of vertically-spaced horizontal cuts). The cutting system 100 also utilizes entirely horizontally-spinning cutting wire pulleys. Furthermore, the cutting wires pass through kerfs in a cutting phase and pass through the kerfs again in a return phase for continuous cutting.

Additional Considerations

The detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The detailed description is, therefore, not to be taken in a limiting sense. The scope of the current invention is defined only by the appended claims, along with the full scope of equivalents to which such claims are entitled.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A material cutting system for cutting a unit of input material, the material cutting system comprising:

a frame;

a plurality of rollers rotatably supported on the frame; and a cutting assembly including:

a plurality of pulleys rotatable relative to the frame about a vertically extending axis;

a drive motor drivably connected to the plurality of pulleys; and a plurality of cutting wires entrained on the plurality of pulleys such that rotation of the pulleys via the drive motor cycles the cutting wires horizontally, wherein the plurality of rollers are configured to rotate thereby advancing the input material unit toward the cutting wires such that the plurality of cutting wires cut a plurality of vertically spaced kerfs into the input material unit and hence form a plurality of cut sections, and wherein the plurality of cutting wires are configured to pass through the plurality of kerfs in a first direction in a cutting phase and in a second direction opposite the first direction in a return phase thereby effecting continuous cutting of the unit of input material.

2. The material cutting system of claim 1, wherein the plurality of pulleys and hence the plurality of cutting wires are configured to be vertically adjustably spaced from each other for cutting the input material unit into the plurality of cut sections of predetermined thicknesses.

3. The material cutting system of claim 2, wherein the cutting assembly further includes a drive train having a drive shaft configured to removably receive some of the plurality of pulleys.

4. The material cutting system of claim 1, wherein the cutting assembly further includes a plurality of straight mounting arms and a plurality of offset mounting arms, some of the plurality of pulleys being mounted on the plurality of straight mounting arms and some of the plurality of pulleys being mounted on the plurality of offset mounting arms.

5. The material cutting system of claim 1, further comprising a plurality of drive motors configured to rotate some of the plurality of rollers, and a control system configured to independently activate the plurality of drive motors for selectively advancing the input material unit and another input material unit.

6. The material cutting system of claim 1, further comprising a shimming system configured to automatically insert shims into the kerfs.

7. The material cutting system of claim 6, further comprising a control system configured to control the shimming system such that shims are insertable at adjustable heights.

8. The material cutting system of claim 6, further comprising a control system configured to control the shimming system such that shims are insertable at a plurality of heights within a single cutting operation.

9. The material cutting system of claim 1, wherein some of the plurality of rollers are configured to be adjusted vertically for accommodating input material units of different sizes.

10. A stone cutting system for cutting a stone block, the stone cutting system comprising:

a cutting station including:

a frame;

a lower conveyor including a first plurality of rollers and supported on the frame;

a middle conveyor including a second plurality of rollers, the middle conveyor being vertically adjustable on the frame;

an upper conveyor including a third plurality of rollers;

at least one drive motor drivably connected to at least one of the first plurality of rollers, the second plurality of rollers, and the third plurality of rollers for advancing the stone block on one of the lower conveyor, the middle conveyor, and the upper conveyor; and a cutting assembly including:

a plurality of pulleys rotatable relative to the frame about a vertically extending axis;

a drive motor drivably connected to the plurality of pulleys; and a plurality of cutting wires entrained on the plurality of pulleys such that rotation of the pulleys via the drive motor cycles the cutting wires horizontally, wherein at least one of the first plurality of rollers, the second plurality of rollers, and the third plurality of rollers are configured to rotate thereby advancing the stone block toward the cutting wires such that the plurality of cutting wires cut a plurality of vertically spaced kerfs into the stone block and hence form a plurality of stone sections.

11. The stone cutting system of claim 10, further comprising a loading lift including a carriage configured to raise the stone block to the middle conveyor or the upper conveyor.

12. The stone cutting system of claim 10, further comprising an unloading lift including a carriage configured to lower the stone block from the middle conveyor or the upper conveyor.

13. The stone cutting system of claim 10, wherein the plurality of pulleys and hence the plurality of cutting wires are configured to be vertically adjustably spaced from each other for cutting the stone block into stone sections of predetermined thicknesses.

14. The stone cutting system of claim 10, wherein the cutting assembly further includes a plurality of straight mounting arms and a plurality of offset mounting arms, some of the plurality of pulleys being mounted on the plurality of straight mounting arms and some of the plurality of pulleys being mounted on the plurality of offset mounting arms.

15. The stone cutting system of claim 10, further comprising a shimming system configured to automatically insert shims into the kerfs.

16. The stone cutting system of claim 15, further comprising a control system configured to control the shimming system such that shims are insertable at adjustable heights.

17. The stone cutting system of claim 15, further comprising a control system configured to control the shimming system such that shims are insertable at a plurality of heights within a single cutting operation.

18. The stone cutting system of claim 10, wherein the plurality of cutting wires are configured to pass through the plurality of kerfs in a first direction in a cutting phase and in a second direction opposite the first direction in a return phase thereby effecting continuous cutting of the unit of input material.

19. A stone cutting system for cutting a stone block, the stone cutting system comprising:

a cutting station including:

a frame;

a lower conveyor including a first plurality of rollers and supported on the frame;

a middle conveyor including a second plurality of rollers, the middle conveyor being vertically adjustable on the frame; and an upper conveyor including a third plurality of rollers;

at least one drive motor drivably connected to at least one of the first plurality of rollers, the second plurality of rollers, and the third plurality of rollers for advancing the stone block on one of the lower conveyor, the middle conveyor, and the upper conveyor;

a cutting assembly including:

a plurality of pulleys rotatable relative to the frame about a vertically extending axis;

a drive motor drivably connected to the plurality of pulleys; and a plurality of cutting wires entrained on the plurality of pulleys such that rotation of the pulleys via the drive motor cycles the cutting wires, wherein at least one of the first plurality of rollers, the second plurality of rollers, and the third plurality of rollers are configured to rotate thereby advancing the stone block toward the cutting wires such that the plurality of cutting wires cut a plurality of vertically spaced kerfs into the stone block and hence form a plurality of stone sections;

a spray system configured to spray a fluid near the kerfs to cool at least one of the plurality of stone sections and the cutting wires; and a shimming system configured to automatically insert shims into the kerfs;

a loading lift including a carriage configured to raise the stone block to at least one of the middle conveyor and the upper conveyor;

an unloading lift including a carriage configured to lower the plurality of stone sections from at least one of the middle conveyor and the upper conveyor; and a control system configured to activate the at least one drive motor of the cutting station, the drive motor of the cutting assembly, and the shimming system.

* * * * *